United States Patent Office 3,748,241
Patented July 24, 1973

3,748,241
PRODUCTION OF CELLULOSIC GRAFT POLYMERS OR COPOLYMERS BY THE USE OF A MINERAL ACID AND RADIATION
John Lyndon Garnett, 29 Arabella St., Longueville, New South Wales, Australia, and Sergio Dilli, 14 Fitzroy St., Croydon, New South Wales, Australia
No Drawing. Filed Mar. 1, 1972, Ser. No. 230,968
Int. Cl. B01j 1/10, 1/12
U.S. Cl. 204—159.12                6 Claims

ABSTRACT OF THE DISCLOSURE

A process for the production of graft polymers or copolymers by ionising radiation in the presence of mineral acid, wherein cellulose is irradiated in the presence of mineral acid and a solution of styrene in a solvent selected from a specified group capable of swelling the cellulose to enable the styrene to gain access to active sites on the cellulose. Irradiation is carried out at a dose rate and with concentrations of styrene in the solvent and mineral acid which together produce a maximum amount of grafting for a given dose rate.

---

This invention relates to improvements in the production of graft polymers or copolymers by the use of ionising radiation.

By graft polymers or copolymers are meant polymers formed from a "backbone" or "trunk" polymer to which has been grafted a number of side chains or branches of a second polymeric material. It is commonly known that the properties of copolymers may be different from the two materials used in the preparation and generally possess some of the properties of each, this endows the copolymer with distinct advantages.

It is known to provide a process for the production of such graft polymers or copolymers by ionising radiation wherein a backbone or trunk polymer is irradiated in the presence of a solution of a monomeric vinyl compound polymerizable by free radical or ionic mechanism in a solvent, the solvent being capable of swelling the backbone or trunk polymer to enable the monomer to gain access to active sites on the backbone polymer which is carried out at a dose rate and with a concentration of monomer in the solvent which together produce a maximum amount of grafting for a given dose rate.

The present invention is based on the important discovery that the grafting yields of such a process as outlined above can be increased by up to 1000%, at low dose rates in air, vacuum and nitrogen purged solutions, by the inclusion of a mineral acid in the system.

In this invention, the backbone polymer employed is cellulose in the form of paper, fibres, powder, rayon etc. or any of its derivatives such as the ethers and esters of cellulose both aliphatic and aromatic.

By ionising radiation is meant β-rays, γ-rays, neutrons, accelerated electrons and particles, X-rays, ultra-violet rays or mixtures of them such as may be furnished by atomic piles, particle accelerators, radioisotopes, X-rays and other suitable equipment.

The general object of the present invention is to produce graft copolymers by the use of radiation in a manner in which a high degree of grafting of the second polymeric material is achieved by the use of a relatively low radiation dose rate and total dose.

The material used for grafting to the backbone polymer is, according to the invention, styrene, which is a compound polymerisable by free radical or ionic mechanisms.

Suitable solvents for the monomer should be capable of swelling the cellulosic backbone polymer to enable the styrene to gain access to the active sites. The solvent suitable for this function are generally, but not exclusively, those having high dipole monoments and include the common aliphatic alcohols, ketones, and dimethylformamide. Alcohols higher than propanol in the homologous series must be excluded due to their marked inhibition of the grafting process. Methanol, ethanol and acetone are examples of suitable solvents, methanol being preferred.

In the grafting of polymers onto a backbone polymer, it is observed that, for a given dose rate and total dose, a peak in the yield is shown for a very specific concentration. This concentration is referred to as the "peak concentration" or "Trommsdorff Effect peak," and is that concentration of styrene for which the grafting to the cellulose is a maximum at a given dose rate and radiation total dose. The actual concentration at which the peak occurs will vary with different materials and the grafting yield falls sharply at concentrations above and below this value. The nature of the peak is dependent on dose rate and total dose and, most importantly on acidity.

Previous evidence has suggested that the Trommsdorff Effect is proton induced, that is, energetic protons produced radiolytically in the system are responsible for the accelerated graft either by addition to the monomer to give the active grafting species or by proton abstraction of the backbone or trunk polymer to give new sites for grafting.

If mineral acid is added, then the secondary electrons from the radiolysis combine with H+ from the mineral acid to give more H atoms capable of accelerating the Trommsdorff Effect:

$$H^+ + e \rightarrow H°$$

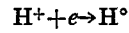

Thus it has been found that the inclusion of mineral acid in the system can result in the Trommsdorff Effect peak being formed where no Trommsdorff Effect peak was evident before, and moreover, not only can the Trommsdorff Effect peak be induced in a given system but the intensity of an already present peak can be increased. The position of the Trommsdorff Effect peak can be changed; for example, without acid, in styrene in MeOH under certain conditions the peak occurs at 30%. With acid, the peak can be induced in these solutions at 10% and under certain conditions it is thought that it may be induced at a concentration as low as 1%. The efficiency of grafting increases at lower concentrations, and in the presence of acid, when the grafting yield is increased (Table 3), the homopolymer yield is decreased and may well approach close to zero, that is, all the styrene, especially in dilute solution, goes to graft.

Graft yield depends on acidity and $H_2SO_4$ gives the best results as a general rule (see Table 4).

Referring to the tabulated data.

Table 1 illustrates the effect of water on grafting; and
Table 2 and Table 3 the effect of $H_2SO_4$ in irradiations in vacuo;
Table 4 is a comparison between different acids;
Table 5 shows the effect of water in acid solutions, while
Table 6 illustrates the grafting of styrene in methanol to cellulose in the presence of acid at medium total dose and dose rates;
Table 7 is a similar tabel at low total dose and dose rates;
Table 8 is again similar but at very low total dose and dose rates; and
Table 9 shows the effect of dose rates on a graft, with and without use of acid.

TABLE 1.—EFFECT OF WATER

| Styrene percent in MeOH | Graft (percent) in concentration of water (volume percent) | | | | | | | | | | | |
|---|---|---|---|---|---|---|---|---|---|---|---|---|
| | 0 | 1 | 2 | 3 | 4 | 5 | 6 | 8 | 9 | 10 | 12 | 13 |
| 20 | 64.1 | 52.4 | | | | | | | 29.9 | 50.8 | | |
| 30 | 129.0 | 110.5 | 41.5 | | | | | 21.9 | | | | |
| 40 | 93.7 | 68.5 | | 43.5 | | 26.1 | | | | | | |
| 50 | 65.4 | 46.0 | 26.4 | 36.8 | 34.8 | | | | | | | |

Note.—Dose rate: $1.11 \times 10^4$ rad/hr.; total dose: $0.20 \times 10^6$ rad.

Note that when acid is added to solution, it usually is as sulphuric acid. Thus background water runs are necessary for the acid data. Note that the inclusion of 1% of water reduces the graft only slightly. 1% of water is maximum that is usually added when acid is present.

TABLE 2.—EFFECT OF SULFURIC ACID IN VACUUM IRRADIATIONS

| Styrene (percent) in MeOH | Graft (percent) in concentration of sulfuric acid | | | | |
|---|---|---|---|---|---|
| | 0.0 M (A) | $.9 \times 10^{-4}$ M | $.9 \times 10^{-3}$ M | $.9 \times 10^{-2}$ M | $.7 \times 10^{-1}$ M (B) |
| 15 | 35.1 | 38.4 | 31.5 | 50.8 | 78.7 |
| 20 | 61.9 | 69.3 | 65.6 | 87.2 | 109.8 |
| 25 | 99.3 | 112.5 | 110.8 | 123.3 | 162.7 |
| 30 | 104.5 | 113.9 | 98.0 | 109.6 | (¹) |
| 35 | 100.9 | 102.8 | 80.0 | 90.7 | 124.0 |
| 45 | 80.5 | 52.6 | 42.0 | 48.4 | 82.5 |

¹ Very high.
Note.—Dose rate: $6.77 \times 10^3$ rad/hr.; time of irradiation: 17 hours.

Note that at this dose rate and total dose, graft increases with increasing acidity up to 25% styrene in methanol. Above this concentration, effect of acidity of graft is not linear, however up to 45% styrene in methanol, significant increases in graft occur at all concentrations at the highest acidity used. (Compare column A with Column B). Note Trommsdorff peak shifted from 30% without acid to 25% at higher acidities.

TABLE 3.—EFFECT OF SULFURIC ACID IN VACUUM IRRADIATIONS

| Styrene percent in MeOH | Graft (percent) in concentration of sulfuric acid (molarity) | | | | | | | |
|---|---|---|---|---|---|---|---|---|
| | 0.0 (A) | $1.1 \times 10^{-3}$ (B) | $5.4 \times 10^{-3}$ (C) | $1.1 \times 10^{-2}$ (D) | $5.4 \times 10^{-2}$ (E) | $1.1 \times 10^{-1}$ (F) | $5.4 \times 10^{-1}$ (G) | 1.1 (H) |
| 10 | 1.2 | 5.4 | 15.1 | 7.5 | 8.8 | 11.0 | 19.4 | 21.2 |
| 20 | 8.9 | 22.6 | 28.6 | 28.7 | 38.7 | 48.2 | 58.5 | 74.7 |
| 30 | 13.9 | 41.0 | Lost | 44.7 | 47.5 | 49.6 | 39.3 | 27.0 |
| 40 | 16.3 | 27.5 | 37.1 | 17.8 | 34.0 | 30.2 | 30.2 | 16.1 |
| 60 | 29.8 | 31.2 | 28.0 | 29.1 | 26.8 | 23.0 | 16.5 | ¹ 15.1 |
| 80 | 34.1 | 24.8 | 21.7 | 26.5 | 19.3 | 21.3 | ¹ 12.4 | 10.1 |

¹ Phase separation observed.
Note.—Dose rate: $2.78 \times 10^4$ rad/h.; Total dose: $0.20 \times 10^6$ rad.

Note that difference between this Table 3 and preceding Table 2 is the different dose-rate and total dose. Note also:

(1) No Trommsdorff without acid under present conditions (column A)
(2) With acid present, even at $10^{-3}$ M, Trommsdorff effect *has been induced*, therefore effect is presumably due to H atoms
(3) That position of Trommsdorff peak gradually shifts from 30% concentration at $10^{-3}$ M to 20% at 1.1 M
(4) Acidity of the order of 1.1 M seems to give highest grafts. Higher acidities tend to decompose the cellulose
(5) The greatest percent accelerated graft occurs at 10% concentration (1.2% to 21.2%) at this dose-rate. The next greatest is at 20% (8.9 to 74.7)
(6) At the lower concentrations, namely 10%, 20%, there appears to be little homopolymer present at high acidities. This is a qualitative observation from the fact that there was no cloudiness in solution.

TABLE 4.—GRAFTING IN THE PRESENCE OF DIFFERENT ACIDS

| Styrene (percent) | Graft (percent) in— | | | | | |
|---|---|---|---|---|---|---|
| | No acid | $H_2SO_4$, 1 M | HCl, 2 M | $HNO_3$, 2 M | $HNO_3$, .02 M | AcOH, 2 M | $H_3PO_4$, .67 M |
| 10 | 6.2 | 27.8 | 26.5 | 1.0 | 7.4 | 5.8 | 8.5 |
| 20 | 30.3 | 82.7 | (¹) | 7.5 | 29.1 | 23.2 | 25.8 |
| 30 | 41.3 | 33.7 | ¹ 18.3 | 9.1 | 37.4 | 38.8 | 30.6 |
| 40 | | 19.7 | 19.1 | 11.2 | 30.6 | 36.8 | 28.7 |
| 50 | 38.6 | | | | | | |
| 60 | | ¹ 25.5 | ¹ 15.1 | 20.6 | 34.8 | 42.5 | 30.4 |
| 80 | 56.1 | ¹ 20.6 | ¹ 8.6 | 8.0 | 28.5 | ¹ 42.2 | 31.5 |

¹ Phase separation observed.
Note.—Dose rate: $2.64 \times 10^4$ rad/h.; total dose: $0.20 \times 10^6$ rad.

Note that 1 M $H_2SO_4$ is the best of all the mineral acids for cellulose. At the lowest concentration (10%), 2 M HCl is almost as good as 1 M $H_2SO_4$.

TABLE 5.—EFFECT OF WATER ON GRAFTING IN ACIDIFIED SOLUTION

| Acid (M) | Graft (percent) in concentration of water (volume percent) | | | | | | | | |
|---|---|---|---|---|---|---|---|---|---|
| | 0 | 1 | 2 | 3 | 3.5 | 4 | 5 | 7.5 | 8 | 8.5 |
| 0.0 | 129.0 | 110.5 | 41.5 | | | | | | 28.9 | |
| $2.1 \times 10^{-3}$ | | 140.7 | | 69.9 | | | 35.7 | | 22.4 | |
| $2.1 \times 10^{-2}$ | | 153.0 | | 80.1 | | | 31.5 | | 17.7 | |
| $2.1 \times 10^{-1}$ | | 181.2 | | 78.1 | | | | 31.9 | 17.8 | |
| 2.1 | | 36.3 | 33.3 | 31.5 | 29.7 | 32.8 | | | | |

Note.—Monomer concentration: 30%; dose rate: $1.11 \times 10^4$ rad/hr.; total dose: $0.20 \times 10^6$ rad.

Note that although 1% $H_2O$ present reduces the grafting slightly (Table 1), with acid present, accelerated grafting was observed.

TABLE 6.—EFFECT OF DOSE RATE ON GRAFT [1]

| Method of grafting | Graft (percent) dose rate (rad/hr.) | |
| --- | --- | --- |
| | 1.95×10⁴ | 4.05×10³ |
| Neutral: | | |
| Air | 49.1±5.4 | 36.9±0.7 |
| Vacuum | 43.0±0.7 | 25.8±1.6 |
| Acidified: | | |
| Air | 15.4±1.8 | 41.1±6.1 |
| Vacuum | 76.8 | 44.5±2.6 |

[1] Total dose=0.2 Mrad.

Note at low dose rates, grafting in vacuum accelerated by acid, whereas at much higher dose rates grafting is accelerated by acid in both air and vacuum.

TABLE 7.—GRAFTING OF STYRENE IN METHANOL TO CELLULOSE IN THE PRESENCE OF ACID AT MEDIUM TOTAL DOSE AND DOSE RATES

| | Dose rate (krad/hour) | | | | | | | |
| --- | --- | --- | --- | --- | --- | --- | --- | --- |
| | 94.5 | | 96 | | 97 | | 105 | |
| | Total dose (krad) | | | | | | | |
| | 70 | | 100 | | 30 | | 100 | |
| Acid (molar) | 0 | 0.1 | 0 | 1.0 | 0 | 0.1 | 0 | 1.0 |
| Concentration of styrene in methanol (volume/volume) at: | | | | | | | | |
| 10% | 0.3 | 1.5 | 0.7 | 5.1 | 0 | 0.2 | 1.1 | 2.1 |
| 15% | 1.3 | 2.3 | 2.6 | 14.3 | 1.3 | 0.8 | 3.1 | 4.4 |
| 20% | 2.7 | 4.3 | 5.9 | 17.5 | 3.4 | 4.7 | 4.7 | 7.8 |
| 25% | 4.3 | 8.4 | 8.8 | 18.8 | 5.5 | 7.4 | 6.9 | 10.1 |
| 30% | 5.5 | 9.5 | 10.4 | 18.6 | 7.0 | 9.4 | 8.6 | 12.2 |
| 35% | 7.0 | 10.0 | 11.7 | 17.2 | 9.2 | 10.7 | 10.0 | 12.5 |
| 40% | 8.7 | 11.7 | 12.7 | 16.5 | 9.9 | 9.2 | 11.0 | 13.3 |

TABLE 8.—GRAFTING OF STYRENE IN METHANOL TO CELLULOSE IN THE PRESENCE OF ACID AT LOW TOTAL DOSE AND DOSE RATES

| | Dose rate (krad/hour) | | | | | | | | | | | |
| --- | --- | --- | --- | --- | --- | --- | --- | --- | --- | --- | --- | --- |
| | 18.7 | | 18.7 | | 39.6 | | 39.6 | | 64.4 | | 64.4 | |
| | Total dose (krad) | | | | | | | | | | | |
| | 65.6 | | 28.1 | | 29.7 | | 69.3 | | 32.2 | | 75.1 | |
| Acid (molar) | 0 | 0.5 | 0 | 0.5 | 0 | 0.5 | 0 | 0.5 | 0 | 0.5 | 0 | 0.5 |
| Concentration of styrene in methanol (volume/volume) at: | | | | | | | | | | | | |
| 20% | 15.0 | 22.5 | 3.1 | 5.2 | 3.0 | 2.1 | 7.1 | 12.1 | 2.1 | 2.0 | 4.7 | 8.2 |
| 25% | 20.2 | 25.7 | 5.5 | 5.6 | 1.7 | 5.0 | 9.3 | 15.0 | 1.7 | 1.8 | 6.6 | 11.3 |
| 30% | | | | | 3.4 | 6.9 | 11.3 | 14.8 | 2.3 | 3.2 | 7.4 | 11.2 |

TABLE 9.—GRAFTING OF STYRENE IN METHANOL TO CELLULOSE IN THE PRESENCE OF ACID AT VERY LOW TOTAL DOSE AND DOSE RATES

| | Dose rate (krad/hour) | | | | | | | |
| --- | --- | --- | --- | --- | --- | --- | --- | --- |
| | 4.8 | | 4.8 | | 9.1 | | 9.1 | |
| | Total dose (krad) | | | | | | | |
| | 2.3 | | 58 | | 28 | | 43 | |
| Acid (molar) | 0 | 1.0 | 0 | 1.0 | 0 | 1.0 | 0 | 1.0 |
| Concentration of styrene in methanol (volume/volume) at: | | | | | | | | |
| 20 | 7.8 | 16.2 | 28.2 | 50.0 | 8.0 | 14.2 | 13.3 | 24.3 |
| 22 | 7.0 | 11.9 | 27.6 | 42.2 | 8.0 | 15.8 | 12.8 | 27.9 |
| 24 | 14.5 | 15.4 | 40.4 | 42.9 | 11.0 | 16.9 | 14.9 | 25.6 |
| 26 | 10.3 | 15.8 | 40.6 | 38.3 | 10.8 | 15.9 | 14.5 | 11.4 |
| 28 | 10.9 | 12.0 | 48.6 | 31.4 | 13.5 | 10.5 | 17.6 | 12.9 |
| 30 | 12.1 | 14.8 | 48.2 | 27.5 | 12.3 | 16.1 | 18.2 | 20.6 |

The processes of this invention are illustrated in the following examples:

EXAMPLE 1

A strip of cellulose, in the form of filter paper, weighing 0.150 gram is placed in a glass ampoule, covered with a solution of 10% styrene in methanol (volume/volume), and acidified with 1.1 molar sulphuric acid. The ampoule is sealed and exposed to γ-radiation from a $Co^{60}$ source at a dose rate of 27.8 krads per hour. After exposure to a total of 200 krads, the now swollen strip is removed from the ampoule and washed in hot benzene to remove homopolymer.

The weight of the strip after this treatment proved to be 0.182 gram.

EXAMPLE 2

A strip of cellulose, in the form of filter paper, weighing 0.172 gram is steeped in 1.1 molar sulphuric acid, until thoroughly wetted. The strip is placed in a glass ampoule, covered with a solution of 20% styrene in methanol (volume/volume) and the ampoule sealed. After exposure and washing as in Example 1, the treated strip weighed 0.301 gram.

EXAMPLE 3

A strip of cellulose, in the form of filter paper, weighing 0.123 gram is placed in a glass tube, covered with a solution of 15% styrene in methanol (volume/volume) and acidified with 1.0 molar sulphuric acid. The tube is purged with nitrogen, firmly stoppered and exposed to an atomic reactor spent fuel source at a dose rate of 96 krads per hour for a period of 62.5 minutes. After exposure, the swollen strip is removed, washed in hot benzene and weighed.

The strip is found to weigh 0.141 gram.

The claims defining the invention are as follows:

1. A method of grafting styrene onto cellulose, comprising contacting cellulose with a solution of 10 to 50% by volume of styrene in a solvent selected from the groups consisting of ethanol, methanol, propanol, acetone and dimethylformamide in the presence of from 0.1 to 1.1 molar mineral acid and irradiating the resulting mixture at a dose rate of less than 0.250 megarad per hour and a total dose of less than one megarad.

2. A method as claimed in claim 1, wherein said solvent is methanol.

3. A method as claimed in claim 1, wherein the styrene solution is 10% by volume, the mineral acid is 1.1 molar sulphuric acid, the dose rate is 27.8 kilorads per hour and the total dose is 200 kilorads.

4. A method as claimed in claim 1, wherein the styrene solution is 20% by volume, the mineral acid is 1.1 molar sulphuric acid, the dose rate is 27.8 kilorads per hour and the total dose is 200 kilorads.

5. A method as claimed in claim 1, wherein the styrene solution is 15% by volume, the mineral acid is 1.0 molar, the dose rate is 96 kilorads per hour and the total dose is 100 kilorads.

6. A method as claimed in claim 1, wherein the cellulose is contacted with the mineral acid before being added to the styrene solution.

References Cited
UNITED STATES PATENTS

| | | | |
|---|---|---|---|
| 3,567,606 | 3/1971 | Dasgupta et al. | 260—17.4 G C |
| 3,573,235 | 3/1971 | Yamamoto et al. | 266—8 |
| 3,457,198 | 7/1969 | Sobolev | 260—2.2 |
| 3,607,799 | 9/1971 | Barbehenn et al. | 260—17.4 G C |

MURRAY TILLMAN, Primary Examiner

R. B. TURER, Assistant Examiner

U.S. Cl. X.R.

260—17.4 G C